United States Patent [19]
Kissel

[11] Patent Number: 5,162,413
[45] Date of Patent: * Nov. 10, 1992

[54] SALT-CONTAINING SURFACE COATING POLYMER COMPOSITIONS AND SUBSTRATES COATED THEREWITH

[75] Inventor: Charles L. Kissel, Anaheim, Calif.

[73] Assignee: Union Oil Company of California, Los Angeles, Calif.

[*] Notice: The portion of the term of this patent subsequent to Apr. 2, 2008 has been disclaimed.

[21] Appl. No.: 721,999

[22] Filed: Jun. 27, 1991

Related U.S. Application Data

[60] Division of Ser. No. 387,933, Jul. 31, 1989, Pat. No. 5,041,487, which is a continuation-in-part of Ser. No. 373,401, Jun. 30, 1989, Pat. No. 5,041,486, which is a continuation-in-part of Ser. No. 345,029, Apr. 28, 1989, Pat. No. 5,004,563, which is a continuation-in-part of Ser. No. 305,451, Feb. 1, 1989, Pat. No. 5,004,562.

[51] Int. Cl.$^5$ ............................................. C08L 13/02
[52] U.S. Cl. .................... 524/337; 524/413; 524/458; 524/460
[58] Field of Search ............... 524/337, 458, 420, 413

[56] References Cited

U.S. PATENT DOCUMENTS

| | | |
|---|---|---|
| 3,330,697 | 7/1967 | Pechini . |
| 3,900,620 | 8/1975 | Gilman et al. . |
| 4,169,737 | 10/1979 | Burke, Jr. et al. . |
| 4,464,524 | 8/1984 | Karickhoff . |
| 4,474,607 | 10/1984 | Goldie . |
| 4,492,600 | 1/1985 | Brunn . |
| 4,881,975 | 11/1989 | Collier et al. . |
| 5,004,562 | 4/1991 | Kissel ................... 524/457 |

OTHER PUBLICATIONS

Eror, Nicholas G. and Anderson, Harlan U., Polymeric Precursor Synthesis of Ceramic Materials, *Mat. Res. Soc. Symp. Proc.*, vol. 73, pp. 571–577 (1986).

Budd, K. D. and Payne, D. A., Preparation of Strontium Titanate Ceramics and Internal Boundary Layer Capacitors by the Pechini Method, *Mat. Res. Soc. Symp. Proc.*, vol. 32, pp. 239–244 (1984).

Lessing, Paul A., Mixed-Cation Oxide Powders Via Polymeric Precursors, *American Ceramic Society Bulletin*, May 1989, pp. 1002–1007.

*Primary Examiner*—Joseph L. Schofer
*Assistant Examiner*—Jeffrey T. Smith
*Attorney, Agent, or Firm*—Alan H. Thompson; Gregory F. Wirzbicki

[57] ABSTRACT

Tannin block properties in surface coating compositions are increased by admixing a sol or gel containing one or more salts with a polymer and a surface coating paste stock. A novel surface coating composition containing a polymer and salt homogeneously distributed in the composition is prepared from the sol or gel and has increased tannin block properties compared to a composition without the admixed sol or gel.

41 Claims, No Drawings

SALT-CONTAINING SURFACE COATING POLYMER COMPOSITIONS AND SUBSTRATES COATED THEREWITH

RELATED APPLICATIONS

This is a division of application Ser. No. 387933 filed Jul. 31, 1989 now U.S. Pat. No. 5,041,487, which application is a continuation-in-part application of U.S. patent application Ser. No. 373,401, now U.S. Pat. No. 5,041,486 filed Jun. 30, 1989, which is a continuation-in-part application of U.S. patent application Ser. No. 345,029 now U.S. Pat. No. 5,004,563 filed Apr. 28, 1989, which is a continuation-in-part application of U.S. patent application Ser. No. 305,451 now U.S. Pat. No. 5,004,562 filed Feb. 1, 1989.

BACKGROUND OF THE INVENTION

The present invention relates to sol or gel compositions capable of enhancing the tannin blocking property of surface coatings and paints, and particularly latex paints applied to outdoor wood surfaces.

References to paints and surface coating compositions are often used interchangeably; however, paints are used to describe pigmented materials as distinct from clear surface coatings such as lacquers or varnishes. The purposes of paint and surface coatings are aesthetic and/or protective. A coating can enhance the appearance of a substrate in terms of colour and gloss as well as give protection against such problems as weathering or corrosion.

Wood is widely used in buildings for such items as roof trusses, timber frames, joists, doors, window frames, cladding and fencing. However, wood is vulnerable to a variety of degrading influences, often caused by weathering, which include light, moisture and biological attachk. A phenomenon of the weathering of wood is the generation of tannins which migrate in the wood. Tannins in wood are essentially derivatives of tannic acid (also called gallotannic phenolics). Tannins, and their migration in wood, can cause visibility of wood grains through inferior wood surface coatings or can cause discoloration of the coating.

In order to block the effects of tannins, a primer surface coating is usually applied to wood, allowed to dry, and then an overcoat is applied. However, the search continues for better overcoats and for surface coating compositions which require only a single coating application and yet effectively block the effects of tannins in wood substrates. To this end, more effective components of coating compositions which serve as tannin blocking agents are presently being sought.

SUMMARY OF THE INVENTION

The present invention involves a method for enhancing the tannin blocking property of a surface coating composition, including a paint composition. A sol or gel composition containing a salt is added to a polymer composition, or to a surface coating or paint composition containing a polymer, or to a surface coating precursor composition containing a polymer, to produce a product surface coating or paint composition having an enhanced tannin blocking property. The salt in the sol or gel composition is contained in sufficient amount to increase the tannin blocking property of the surface coating composition prepared therefrom. In general, the particular salt utilized and the particular amount of sol or gel composition and salt utilized, depends upon the particular polymer utilized and the particular substrate that is coated.

The invention also involves a surface coating composition comprising a polymer binder and a salt homogeneously distributed in the composition in sufficient concentration to block the effects of tannins contained in a wood-containing substrate, i.e., to prolong the visibility of wood grains of the substrate through the coating and/or discoloration of the coating. The surface coating composition, particularly a waterborne surface coating composition, comprises a sol or gel composition containing a tannin blockenhancing amount of salt, at least one water-soluble or water-dispersible polymer binder, and usually a paste stock containing such ingredients as pigments, coalescing aids, thickening aids, dispersing aids, defoamers, biocides, and fillers.

The surface coating compositions of the invention prepared from the sol or gel composition and polymer are applied to wood-containing substrates. The resultant dried surface coating compositions and the coated substrates formed therefrom provide compositions having enhanced tannin-blocking properties compared to compositions not prepared with the described sol or gel compositions. Such compositions and coated substrates of the invention also can retain adequate scrub and wet adhesion properties while gloss is also enhanced. One of the advantages of the compositions described herein as useful for coating wood-containing substrates is that a single coat of such compositions provides tannin blocking properties which are as effective as a conventional two-coat application.

DETAILED DESCRIPTION OF THE INVENTION

The present invention involves a method for enhancing the tannin blocking property of a surface coating composition, including paint composition. The method includes the step of admixing a sol or gel composition containing a salt with a composition containing a polymer to produce a product admixture composition. The salt is contained in the sol or gel composition in a sufficient concentration to increase the tannin blocking property of a surface coating composition derived from the product admixture composition. The product admixture composition can be either the product surface coating composition or a precursor to the product surface coating composition. The method includes the step of blending the product admixture composition with a surface coating paste stock to provide a product surface coating or paint composition having an improved tannin blocking property compared to one prepared without introducing the salt into the surface coating composition by addition of a salt-containing sol or gel composition. Copending U.S. patent application Ser. No. 373,401, filed Jun. 30, 1989, by the present inventor and incorporated herein by reference in its entirely, describes surface coating compositions effective for reducing the weathering of a wood substrate due to tannin blocking properties of the composition.

Copending U.S. patent application Ser. No. 305,451, filed Feb. 1, 1989, by the present inventor and incorporated herein by reference in its entirety, describes salt-containing sol or gel compositions and their method of preparation, and the admixing of the sols or gels with polymers to produce product admixture compositions which are stable and noncoagulated. In addition to a salt, the sol or gel compositions usually contain a nonaqueous solvent, a stabilizer and, optionally, an acidic component. The solvent is typically an ether, ester, alcohol or combinations thereof, the stabilizer is either a chelator, such as a hydrocarboxylic acid, or a nonionic surfactant, and the acidic component is a protic acid such as nitric acid. Whether or not the acidic component is added to the admixture of solvent, stabilizer and salt, the pH of the admixture, either before or after heating, is generally less than 7.0 and usually less than 4.0. It is preferred that the pH of the admixture of the sol or gel composition be less than about 3.0, particularly when the acidic component is added to the admixture, and it is highly preferred that the pH be less than about 1.0. Also, as will be seen hereinafter in the examples, many instances exist where the pH of the sol or gel composition is less than about 0.1. The salt must be capable of (1) existing as colloidal salt particulates, (2) existing in ion species or (3) forming ions when dispersed in a composition containing a latex polymer. In the formation of a sol or gel, the salt contains cations or anions capable of being dispersed in the admixture of solvent and stabilizer. In one embodiment for preparing the sol or gel containing a solvent, stabilizer, salt and acidic component, the ingredients are admixed at room temperature and slowly heated to a temperature in the range from about 35° C. to about 85° C. for a period sufficient to produce a transparent product, ordinarily from about 0.5 to about 15 hours, and having the color of the characteristic anion or cation of the particular salt in the admixture. The transparent product is a sol or gel composition containing the cations and anions and/or colloidal salt particulates of the particular salt of the admixture. At least one cation and/or at least one anion of the salt is dispersed in the dried resultant latex polymer/salt composition. Although all polymers, including water-soluble polymers, such as water-soluble resins, are contemplated in the present invention, a suitable polymer is a nonconjugated polymer such as a water-dispersible polymer (particularly latex) disclosed in the aforementioned copending application Ser. No. 305,451. Polymer concentrations in compositions containing a starting latex polymer, particularly those with dispersions in aqueous media, are ordinarily greater than about 0.1 weight percent of the composition. Usually the concentrations are greater than 1 weight percent and preferably greater than 5 weight percent, but most commonly in the range from about 40 to 70 percent for those latexes resulting from emulsion polymerization. An intermediate mixture of salt, stabilizer and solvent is heated to prepare a sol or gel which is typically mixed with a starting latex polymer to produce a product admixture containing the salt and latex polymer.

The invention encompasses surface coating compositions which have a continuous and discontinuous phase. The invention is directed to a waterborne surface coating composition wherein the continuous water phase contains a binder comprising a water-soluble polymer, and, more particularly, to waterborne surface coating compositions wherein the discontinuous phase comprises a water-dispersible polymer binder, such as a latex. The discontinuous phase of the surface coating compositions of the invention also contains salt components of the sol or gel compositions described herein and typically a paste stock usually containing one or more of the following components: a pigment, an extender pigment, a coalescing aid, a thickening aid, a dispersing aid, a protective colloid, a defoamer, a biocide, an amine solubilizer, a flow additive, a drier, a cosolvent and a filler material. The waterborne coating compositions of the invention contain water, the sol or gel compositions described herein, usually a paste stock and either water-soluble polymers such as water-soluble resins, alkyds, polyurethanes, unsaturated polyesters, and the like, or water-dispersible polymers such as latex polymers.

Although the invention is not bound by any theory, it is believed that at least some of the particulates derived from the starting salt contained in the sol or gel exists as anions or cations of the salt or colloidal salt particulates, the derived particulates being homogeneously distributed in the resultant polymer/salt composition comprising the surface coating composition of the invention. In contrast to conventional surface coating compositions containing dispersed salts from a paste stock (including ground pigments comprising salts, i.e., salt pigments), which are ordinarily capable of settling over time, the salt components introduced into the surface coating compositions of the invention by means of the sol or gel compositions are continuously and permanently distributed throughout the surface coating composition, or a precursor thereof, so as to be homogeneously distributed in the product composition. The term "homogeneously distributed" as used herein, refers to those arrangements and distributions of salt components (whether cations, anions or colloidal salt particulates) derived from the sol or gel composition being closer to the homogeneity and permanence existing in a true solution (wherein a salt is completely dissolved in water and permanently maintained in such a phase) than that in conventional surface coating compositions containing ground dispersed salt pigments. The finely ground conventional dispersed paint pigment or other additive comprising a salt is considered herein to be heterogeneously distributed in a surface coating composition. When viewing the distribution of salt components in surface coating compositions with visibility aids weaker than the ultra microscope, the homogeneity of the salt components of the compositions of the invention is better than that for the ground pigment salts, and the like, of conventional surface coating compositions. In the present context, the distribution and arrangement of butterfat particles in homogenized milk, when viewed through a magnifying glass, is considered homogeneous.

Although any polymer binder compatible with the salt components of the sol or gel compositions described herein may be utilized in a surface coating composition of the invention, water-dispersible polymers are preferred. In a preferred embodiment, a typical polymerization process yields an emulsion comprising a latex polymer and water. However, the emulsion can further comprise a surfactant, a chain transfer agent, catalysts, and activators.

The emulsion in combination with the salt-containing sol or gel compositions described herein (i.e., product admixture composition) can be used to replace at least a portion of the polymer binder used in a waterborne surface coating composition, such as a water-base paint composition containing a latex polymer. A typical surface coating or paint composition comprises an emulsion containing a polymer binder, salt (from a sol or gel) which is homogeneously distributed therein, at least one pigment, a coalescing aid, a thickening aid, a dispersing aid, a defoamer, a biocide, and a filler. Coalescing aids, thickening aids, dispersing aids, defoamers, biocides and fillers suitable for use in surface coating paint compositions are well known to those skilled in the art. Exemplary polymer binders include, but are not limited to, resins, vinyl acrylic polymers, acrylic polymers, vinyl chloride acrylic polymers, styrene/butadiene copolymers, styrene/acrylate copolymers, and vinyl acetate-/ethylene copolymers. Also included are those polymers disclosed in the aforementioned copending application Ser. No. 305,451. Generally, up to about 30 weight percent of the solid content of the polymer binder can be replaced by the product admixture composition of the invention. Usually, the product admixture composition replaces about 1 to about 30 weight percent of the polymer binder's solid content. Preferably, from about 5 to about 25, and more preferably from about 10 to about 20 weight percent of the solid content of the polymer binder is replaced by the product admixture composition. Paint compositions suitable for use in conjunction with the product admixture composition typically have a pigment volume concentration (pvc) of less than about 25 volume by volume percent (v/v%). Preferably, the paint composition has a pvc of about 15 to about 25 v/v%.

In addition to a polymer binder and a sol or gel composition containing a salt, the surface coating composition of the invention can contain a surface coating paste stock. The paste stock, particularly a paste stock suitable in combination with a water-dispersible polymer, usually contains at least one pigment and usually at least one of the aforementioned additives such as a coalescing aid, a thickening aid, a defoamer, a biocide and/or a filler material or extender. Copending U.S. patent application Ser. No. 345,029, filed Apr. 28, 1989, by the present inventor and incorporated herein by reference in its entirety, describes compounding ingredients for use during blending with a product admixture composition. In the present invention, a waterborne coating composition containing a water-soluble polymer binder and water usually contains a surface coating paste stock containing at least one pigment and usually at least one additive such as a pigment dispersant, an amine solubilizer, a flow additive, a drier, and/or a cosolvent. Conventional ground pigments useful herein include titanium dioxide; copper carbonate; manganese dioxide; lead, zinc and boron chromates; cadmium sulphide; iron oxides; Prussian blue; cobalt blue; ultramarine; chromium oxide; cadmium selenide; red lead; chrome lead; zinc oxide; antimony oxide and lead or calcium carbonate. The salt components derived from the sol or gel composition described herein can also comprise all or a part of the pigment contained in the surface coating composition. As disclosed in the aforementioned copending U.S. application Ser. No. 305,451, several salts contained in the sol or gel compositions provide either color or colorless compositions. For instance, aluminum acetate sol is yellow, aluminum nitrate sol is colorless, cupric acetate is blue, cobalt acetate is red, neodymium chloride is yellow-green, ferric citrate is brown, etc.

Aside from providing color or lack thereof to a surface coating composition, the salt contained in the sol or gel provides an enhancement to the tannin blocking property of the composition. Such enhancement is particularly effective for the blocking effects of tannins produced from weathering influences on wood-containing substrates which are coated by the surface coating compositions described herein. For example, wood-containing substrates, such as redwood and cedar lumber, are coated with the surface coating compositions described herein.

Several of the salts contained in the sol or gel compositions, as described in the aforementioned U.S. application Ser. No. 305,451, are utilized to prepare the surface coating compositions of the invention. Particularly useful salts for the surface coating compositions include the acetates, citrates, nitrates and halides of ammonium, silver, aluminum, bismuth, boron, calcium, cadmium, cerium, cobalt, chromium, cesium, copper, dysprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium. Preferred salts include the acetates of ammonium, aluminum, barium, boron, calcium, chromium, cobalt, copper, dysprosium, lead, lithium, lanthanum, magnesium, neodymium, potassium, praseodymium, silicon, silver, sodium, strontium, thorium, uranium, and zinc, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, dysprosium nitrate, lanthanum nitrate, neodymium nitrate, bismuth nitrate, lanthanum oxide, lead nitrate, erbium nitrate, europium nitrate, samarium nitrate and yttrium nitrate. Highly preferred salts contain an aluminum metallic cation, more particularly an aluminum-containing salt such as aluminum acetate, aluminum chloride, aluminum nitrate or aluminum isopropoxide. Also, tetrapropylammonium bromide is highly preferred.

In one embodiment of the invention, a sol or gel containing a salt is admixed with a polymer such as a resin. The product admixture composition is blended with a surface coating paste stock to produce a water-soluble surface coating composition. In a preferred embodiment, the salt-containing sol or gel is admixed with a latex polymer, water and a surface coating paste stock to produce a water-dispersible surface coating composition. The product coating compositions have enhanced tannin blocking properties and also such salt addition does not substantially reduce the scrub or wet adhesion properties of the compositions.

The surface coating paint composition can be applied to at least a portion of a surface of a wood-containing substrate. When applied to the substrate, the surface coating or paint, upon drying, forms a dried (nonaqueous) resultant coating composition that typically has a better tannin-blocking property than the same coating composition not containing the salt derived from the sol or gel composition described herein. In the method of the invention, sufficient salt (i.e., a tannin blocking-enhancing amount of salt) is incorporated into the sol or gel composition and/or sufficient sol or gel-containing salt is admixed with a composition containing a polymer and/or a paste stock in an amount to increase the tannin blocking property of a surface coating composition of the invention compared to the same surface coating composition not containing the salt from the sol or gel composition. When applied on wood-containing substrates, (1), the dried sol or gel composition or (2) the dried product admixture composition or (3) the dried surface coating compositions described herein of the instant invention are capable of reducing the effects of tannins.

A tannin blocking-enhancing amount of the salt is homogeneously distributed in the surface coating composition of the invention or its precursor by a method involving admixing a sol or gel composition containing sufficient salt with a composition containing a polymer and ordinarily also with a surface coating paste stock. In general, the concentration of salt homogeneously distributed in the surface coating composition is about 0.02 and about 1 weight percent. Typically the concentration of sol or gel composition in the surface coating composition which is necessary to achieve such salt concentrations is usually about 0.1 to about 5 weight percent. Furthermore, the concentration of salt in the sol or gel composition is usually about 1 to about 50, preferably about 10 to about 20 weight percent. Moreover, when the sol or gel composition is first admixed with a composition containing a polymer to produce a product admixture composition prior to blending with a surface coating paste stock, the concentration of the sol or gel in the product admixture composition is usually about 0.5 to about 25 weight percent, and the concentration of the salt (from the sol or gel composition) in the product admixture composition is ordinarily about 0.1 to about 5 weight percent.

Examples of sol or gel compositions or product admixture compositions or surface coating compositions described herein include wood pretreatments, primers, stains and paints. For instance, wood pretreatments may be water repellants; primers can include shellac, alkyd primer paint and acrylic latex primer paint; stains may be transparent oil based, semitransparent oil-based, transparent latex, semitransparent latex, solid color oil or latex; and paints can be oil-based or latex, indoor or outdoor and the like. The preferred compositions contain latex.

The sol or gel compositions, the product admixture compositions or the surface coating compositions of the invention are applied either to the surface of an uncoated wood substrate, or applied to such substrates over a previously coated surface. The applied surface coating composition of the invention is dried by suitable methods known in the art to produce a dried, resultant coating composition containing a coalesced polymer and salt components derived from the sol or gel composition.

The resulting coated substrate comprising the wood substrate and the dried resultant surface coating composition of the invention has a dried resultant surface coating having an enhanced tannin blocking property compared to a comparable coating composition not prepared with the sol or gel composition described herein. Either a coated substrate comprising a wood-containing substrate and the dried resultant surface coating composition or the surface coating composition may, in addition to the tannin blocking properties, contain a controlled quantity of sol or gel composition and/or salt contained therein, so as to have controlled opacity and/or color and other visual effects.

The resulting coated substrates produced by the combination of the dried resultant coating composition and the wood substrate upon which the surface coating composition of the invention is at least partially applied also depend upon the reaction between the coating composition of the invention and the particular wood substrate that is coated.

The tannin blocking property of the compositions described herein, e.g., the sol or gel compositions, the product admixture compositions, the product admixture compositions containing the sol or gel compositions in combination with a composition containing a polymer such as latex or water-soluble resins, the combinations of sol or gel compositions with compositions containing a polymer and with surface coating paste stocks, the dried resultant compositions of the aforementioned compositions and combinations, and the coated wood-containing substrates of the aforementioned composition, refers to the capability of the composition to inhibit or prolong the visibility of wood grains of a wood-containing substrate through the composition and/or inhibit or prolong discoloration of the coating. For purposes herein, an accelerated weathering evaluation of the tannin block property of the compositions described herein is determined by applying a single coating of the evaluation composition on a wood-containing substrate, such as redwood, cedar and the like, drying the coating for at least one half hour, and exposing the substrate to 4 hour intervals of light (using UVB-313 lamps at 45° C.) and moist darkness for at least one week. A typical evaluation of tannin block properties involves the placement of coated wood-containing substrates in a QUV Weatherometer (Q-Panel Company, Cleveland, Ohio) for one week and visual observation of the wood grains and the discoloration of the coating.

The invention is further illustrated by the following examples which are illustrative of specific modes of practicing the invention and are not intended as limiting the scope of the invention defined by the appended claims.

EXAMPLE 1

A 2 liter resin kettle is charged with 492 g ethylene glycol, 100 g aluminum acetate, 333 g citric acid, and 30 ml concentrated nitric acid. The mixture is heated to 70° C. for 4 hours. The material is then cooled to room temperature. The resulting straw colored sol has a pH of <0.1 and a Brookfield viscosity of 450 cps.

The following ingredients are blended together to prepare a paint paste stock according to Federal Specification TT-P-19D: 316.5 water, 5.0 g Natrosol 250MBR, 10.2 g Colloids 226/35, 2.0 g Igepal CO630, 3.5 g Colloids 640, 2.0 g Nuosept 95, 1.5 g AMP-95, 1.5 g potassium tripolyphosphate, 250.0 g Tronox CR822, 27.8 g ethylene glycol, 50.0 g Kadox 555, and 175.0 g Minex 4. After all ingredients are added and a homogeneous material is obtained, 13.8 g Texanol, 3.5 g Colloids 643, and 6.0 g Polyphase AF1 are blended into the paint paste stock.

The sol is blended into a commercial styrene-vinyl acrylic latex (commercially available as 76 RES 6510 from Unocal Chemicals Division, Schaumburg, Ill., herein "Unocal"). The sol to latex weight ratio is 1:10, obtained by using 36.0 g sol and 324.0 g latex.

The product paint is obtained by blending 360.0 g of the sol/latex product admixture composition into 1225.8 g of the paint paste stock. The resulting formulation had a viscosity of 95KU, a density of 11.81 lbs/gal and a total solids of 58.1% by weight.

EXAMPLE 2

The rough finished side of redwood clap board is painted by brush with the paint obtained in Example 1. An additional section of board is painted with a paint formulation like that in Example 1, except without the sol, and 360.0 g of Unocal 76 RES 6510 styrene-vinyl acrylic latex is used. Single coats of paint are compared subjectively and visually upon drying for 30 minutes.

The paint prepared from the aluminum acetate sol and latex hid the redwood grain better than the comparable paint without the sol.

EXAMPLE 3

Several sols containing salts and ethylene glycol solvent are evaluated as tannin block agents. Four latexes are used: a styrene-vinyl acrylic latex (Unocal 76 RES 6510), a polyvinylacetate, i.e., PVA latex (Unocal 76 RES 60011), a polyvinylacetate, i.e. PVA latex (Unocal 76 RES 6004) and a styrene butadiene rubber, i.e. SBR latex (Unocal 76 RES 4076). Product admixture compositions containing sol and latex in a 1:10 weight ratio, respectively, are prepared and added to the paint paste stock of Example 1 to produce product paints as set forth in Example 1. The sols containing a citric acid stabilizer are prepared in the same manner as in Example 1 and the sols containing nonionic surfactant stabilizers (Igepal CO610, CO620, CO630-phenoxypolyoxyethylenes) are also prepared in the same manner as in Example 1, except no nitric acid is added. The product paints are evaluated in the same manner as in Example 2.

The following Table A summarizes product paints containing sols having salts and latex polymers which exhibit a suitable tannin blocking property:

TABLE A

| Latex | Salt | Sol Stabilizer |
|---|---|---|
| 76 RES 6510 | aluminum acetate | citric acid |
| | aluminum acetate | Igepal C0630 |
| | antimony glycoxide | citric acid |
| | barium carbonate | citric acid |
| | calcium acetate | citric acid |
| | cupric acetate | citric acid |
| | cupric acetate | Igepal C0610 |
| | cupric acetate | Igepal C0620 |
| | cupric acetate | Igepal C0630 |
| | dysprosium acetate | citric acid |
| | lanthanum nitrate | citric acid |
| | neodymium nitrate | citric acid |
| | strontium acetate | citric acid |
| | tetrapropylammonium bromide | citric acid |
| | yttrium nitrate | citric acid |
| 76 RES 60011 | aluminum acetate | citric acid |
| | aluminum acetate | Igepal C0630 |
| | antimony glycoxide | citric acid |
| | bismuth nitrate | citric acid |
| | boron acetate | citric acid |
| | cupric acetate | citric acid |
| | cupric acetate | Igepal C0630 |
| | lanthanum oxide | citric acid |
| | neodymium nitrate | citric acid |
| | lead acetate | citric acid |
| | tetrapropylammonium bromide | citric acid |
| 76 RES 6004 | aluminum acetate | citric acid |
| | aluminum acetate | Igepal C0630 |
| | antimony glycoxide | citric acid |
| | cupric acetate | citric acid |
| | cupric acetate | Igepal C0630 |
| | erbium nitrate | citric acid |
| | europium nitrate | citric acid |
| | lanthanum nitrate | citric acid |
| | neodymium nitrate | citric acid |
| | samarium nitrate | citric acid |
| | tetrapropylammonium bromide | citric acid |
| 76 RES 4076 | aluminum acetate | citric acid |
| | aluminum acetate | Igepal C0630 |
| | antimony glycoxide | citric acid |
| | cupric acetate | citric acid |
| | cupric acetate | Igepal C0630 |
| | samarium nitrate | citric acid |
| | tetrapropylammonium bromide | citric acid |

The paint compositions of Table A indicate that several sols in combination with various kinds of latexes give good tannin block performance as freshly painted coatings on redwood board.

All product paints are evaluated for performance under accelerated weathering conditions. Redwood panels are placed in a QUV Weatherometer for 1 week using 4 hour cycles of light (using UVB-313 lamps, 45° C.) and moist darkness. The panels are again evaluated for tannin block performance. Although all the product paint compositions exhibit suitable tannin blocking performance, substantially better performance without discoloration of the coating is observed in all four latex paints containing the aluminum acetate-containing sol prepared with a citric acid stabilizer.

EXAMPLE 4

Several aluminum salts are utilized to prepare sols containing ethylene glycol solvent using the method of Examples 1 and 3. Using the method of Example 1, paints are prepared with various aluminum-containing salts in respective sols and combined with the latexes of Example 3 and the paint paste stock of Example 1. The product paint compositions are tested as in Examples 2 and 3 and the evaluations summarized in Table B.

TABLE B

| Aluminum Salt | Sol (Ethylene Glycol Solvent) Stabilizer | Latex | After QUV, Rating* |
|---|---|---|---|
| none | none | 76 RES 4076 | 0 |
| acetate | citric acid | 76 RES 4076 | 5 |
| acetate | Igepal C0630 | 76 RES 4076 | 1 |
| isopropoxide | citric acid | 76 RES 4076 | 3 |
| nitrate | citric acid | 76 RES 4076 | 4 |
| nitrate | Igepal C0630 | 76 RES 4076 | 1 |
| ammonium sulfate | citric acid | 76 RES 4076 | 2 |
| none | none | 76 RES 60011 | 0 |
| acetate | citric acid | 76 RES 60011 | 5 |
| acetate | Igepal C0630 | 76 RES 60011 | 1 |
| isopropoxide | citric acid | 76 RES 60011 | 4 |
| nitrate | citric acid | 76 RES 60011 | 3 |
| nitrate | Igepal C0630 | 76 RES 60011 | 1 |
| ammonium sulfate | citric acid | 76 RES 60011 | 2 |
| none | none | 76 RES 6004 | 0 |
| acetate | citric acid | 76 RES 6004 | 4 |
| acetate | Igepal C0630 | 76 RES 6004 | 1 |
| isopropoxide | citric acid | 76 RES 6004 | 5 |
| nitrate | citric acid | 76 RES 6004 | 2 |
| nitrate | Igepal C0630 | 76 RES 6004 | 1 |
| ammonium sulfate | citric acid | 76 RES 6004 | 3 |

*5 = best
0 = worst

The accelerated weathering results indicated in Table B suggest the paints derived from the citric acid stabilized sols are better than those derived from the phenoxypolyoxyethylene surfactant-based sols. Furthermore, aluminum acetate and aluminum isopropoxide salts contained in the sols provide paints having superior tannin blocking properties.

EXAMPLE 5

In accordance with the method of Example 1, five paints are prepared with four containing 10 weight percent aluminum acetate sol prepared with citric acid as in Example 1 and one without the sol. The four product paints containing the sol contain 5, 15, 25 and 35 weight percent sol, respectively, based on the latex. These paint products are evaluated for tanning blocking under the QUV conditions illustrated in Example 3 and summarized in Table C.

TABLE C

| Amt. Sol | Amt. Latex | Wt % Sol | 76 RES 4076* | 76 RES 60011* | 76 RES 6004* | 76 RES 6510* |
|---|---|---|---|---|---|---|
| 0 g | 200 g | 0 | 2 | 2 | 2 | 2 |
| 10 g | 190 g | 5 | 5 | 5 | 5 | 5 |
| 30 g | 170 g | 15 | 4 | 4 | 4 | 4 |
| 50 g | 150 g | 25 | 3 | 3 | 3 | 3 |
| 70 g | 130 g | 35 | 1 | 1 | 2 | 1 |

*Subjective rating after 1 week in QUV (5 = best)

The results in Table C indicate that a 10 weight percent aluminum acetate sol blended in a 5 weight percent amount with a latex, and then compounded into a paint paste stock produces a surface coating or paint composition having superior tannin blocking properties.

EXAMPLE 6

A citric acid stabilized sol is prepared using 20 weight of aluminum acetate. The sol is blended with latexes utilized in Example 4 at 5%, 10% and 15 weight percent (based on the latex), which are then utilized with the paint paste stock of Example 1 to prepare three product paint compositions, which are evaluated under weathering QUV conditions.

TABLE D

| Amt. Sol in Latex, Wt % | 76 RES 4076* | 76 RES 60011* | 76 RES 6004* |
|---|---|---|---|
| 5 | 5 | 1 | 2 |
| 10 | 4 | 5 | 5 |
| 15 | 3 | 3 | 3 |

*Subjective Rating (5 = best)

Such results indicate that a sol contained in an amount from about 5 to about 10 weight percent of the latex is highly preferred when the sol contains about 15 to about 25 weight percent of aluminum acetate.

EXAMPLE 7

Citric acid stabilized sols prepared by the method of Example 1 containing aluminum acetate are prepared at various concentrations of aluminum acetate. The sols are blended with the latexes utilized in Example 4 so that the same concentration of aluminum acetate salt is present in each sol/latex product admixture composition. The product admixture compositions are utilized with the paint paste stock of Example 1 to prepare product paint compositions in accordance with the method of Example 1. The results obtained evaluating the product paint compositions under the QUV weathering conditions of Example 3 are summarized in Table E.

TABLE E

| Wt % Aluminum Acetate in Sol | Amt. Sol Added to 180 g Latex | 76 RES 4076* | 76 RES 60011* | 76 RES 6004* |
|---|---|---|---|---|
| 10 | 20 g | 1 | 1 | 1 |
| 16 | 14 g | 2 | 2 | 2 |
| 20 | 10 g | 5 | 4 | 5 |
| 21 | 9 g | 5 | 4 | 5 |
| 26 | 4 g | 4 | 5 | 4 |

*Subjective Rating (5 = best)

The results summarized in Table E indicate that an amount of sol in latex is highly effective for tannin blocking when the sol contains at least about about 15 weight percent, preferably at least about 17 weight percent and more preferably at least about 20 weight percent of aluminum acetate salt.

EXAMPLE 8

The method of Example 1 is used to prepare a tetrapropylammonium bromide-containing sol. Forty nine and nine-tenths grams (49.9 g) tetrapropylammonium bromide, 246 g ethylene glycol, 166.4 g citric acid, and no nitric acid are combined. The admixture is heated at 40° C. for 1 hour. The product sol has a pH <0.1 and a viscosity of 344 cps.

A paint paste is prepared using 397.4 g water, 8 g Natrosol Plus, 5.5 g Colloid 226/35, 2.0 g Igepal CO630, 3.0 g Colloid 640, 2.0 g AMP-95, 1.5 g potassium tripolyphosphate, 125 g Tronox CR822, 150 g Minex 4, 100 g ASP-NC2, 20 g ethylene glycol, 1.5 g Nuosept 95, 10. g Texanol, 3 g Colloid 643, and 6 g Polyphase AF1.

Two hundred eighty two (282) grams of a sol/latex product admixture composition, prepared from 30 g of the above-prepared sol and 270 g of a PVA latex, (Unocal 76 RES 3077), are blended with equal quantities of the above-prepared paint paste, but in one paint the aluminum acetate sol of Example 1 is replaced by tetrapropylammonium bromide sol and no sol is admixed with the latex in the other. The product paint compositions are applied to coat redwood. The tannin blocking property of the paints are observed in Table F.

TABLE F

| Sol in Paint | Tannin Block Property |
|---|---|
| none | very poor blocking |
| tetrapropylammonium bromide | good blocking |
| aluminum acetate | fair blocking |

The tetrapropylammonium bromide sol-containing paint exhibits better tannin blocking properties than the aluminum acetate sol-containing paint when a PVA latex (Unocal 76 RES 3077) is employed in the paint formulation of Example 1. Such results indicate the tannin blocking property of a paint or surface coating composition is dependent on the particular latex and/or the particular paint paste utilized with a given sol or gel composition.

In view of the foregoing description of the invention including the examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

I claim:

1. A resultant dried composition containing a polymer and salt components and formed by drying a product surface coating composition on a wood-containing substrate, said surface coating composition prepared by the method comprising the step of admixing a sol or gel composition containing a tannin block-enhancing concentration of a salt in the form of anions, cations and/or colloidal salt particulates with a composition containing a polymer to produce a product surface coating composition or a surface coating precursor composition.

2. A resultant dried composition containing a polymer and salt components and formed by drying a product paint composition on a wood-containing substrate, said product paint composition prepared by the method comprising the step of admixing a sol or gel composition containing a tannin block-enhancing concentration of salt in the form of anions, cations and/or colloidal salt particulates with a paint composition or a paint precursor composition, said paint composition, product paint composition or paint precursor composition each containing a polymer.

3. A resultant dried composition containing a polymer and salt components and formed by drying a surface coating composition on a wood-containing substrate, said surface coating composition prepared by the method comprising the following steps:
   (a) admixing a sol or gel composition containing a salt and having a pH less than about 4.0 with a composition containing a latex of a polymer to produce a product admixture composition containing said salt and said latex of a polymer; and
   (b) blending said product admixture composition with a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material, to produce a surface coating composition having essentially no discoloration after one week when applied and dried on a wood-containing substrate and subjected to 4 hour intervals of light and moist darkness in a QUV Weatherometer.

4. A resultant dried composition containing a polymer and salt components and formed by drying a water-borne surface coating composition on a wood-containing substrate, said surface coating composition prepared by the method comprising the steps of:
   (1) admixing a composition containing a latex of a polymer with a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material, and
   (2) admixing a sol or gel composition containing a salt in the form of cations, anions, and/or colloidal salt particulates with the admixture composition obtained from step (1) to produce a surface coating composition containing said salt in a sufficient amount to enhance the tannin block property of said surface coating composition.

5. A coated wood-containing substrate having a surface at least partially coated with a dried surface coating composition comprising a polymer resulting from emulsion polymerization and salt components in the form of anions, cations and/or colloidal salt particulates wherein said salt components are (1) derived from a salt-containing sol or gel composition having a nonaqueous solvent and (2) in sufficient concentration to enhance the tannin block property of the coating composition.

6. A coated wood-containing substrate having a surface at least partially coated with a dried paint composition containing a polymer and salt components and prepared by the method comprising the steps of:
   (1) admixing a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material with a sol or gel composition containing a salt in the form of cations, anions and/or colloidal salt particulates, said salt in sufficient amount to block tannin effects on said wood-containing substrate when coated on said substrate and
   (2) admixing a composition containing a latex of a polymer with an admixture composition obtained from step (1) to produce a paint composition having enhanced tannin block properties compared to the same surface coating composition which does not contain said sol or gel composition.

7. A coated wood-containing substrate having a surface at least partially coated with a dried paint composition comprising:
   (A) a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material,
   (B) a polymer resulting from emulsion polymerization,
   (C) a sol or gel composition comprising
      (1) a stabilizer comprising a chelator or a nonionic surfactant, and
      (2) at least one salt comprising anions, cations and/or colloidal particulates, said salt in sufficient amount to enhance the tannin block property of said composition when coated on said substrate.

8. The coated wood-containing substrate defined in claim 5 comprising redwood, pine, spruce, cedar, maple, walnut, oak, birch, fir, teak, mahogany, pecan, hemlock, aspen, cherry, and combinations thereof.

9. The coated wood-containing substrate defined in claim 6 comprising redwood, pine, spruce, cedar, maple, walnut, oak, birch, fir, teak, mahogany, pecan, hemlock, aspen, cherry, and combinations thereof.

10. The coated wood-containing substrate defined in claim 7 comprising redwood, pine, spruce, cedar, maple, walnut, oak, birch, fir, teak, mahogany, pecan, hemlock, aspen, cherry, and combinations thereof.

11. The composition defined in claim 1 wherein said surface coating composition or surface coating precursor composition comprises a latex of a polymer resulting from emulsion polymerization and said sol or gel composition comprises an organic solvent and has a pH less than about 4.0.

12. The composition defined in claim 11 wherein said polymer is selected from
   (1) conjugated diolefin polymers containing one or more conjugated diene monomers having 4 to 8 carbon atoms,
   (2) olefin-ester interpolymers containing a monoolefin monomer having up to 4 carbon atoms and an alkenyl or alkenol ester of a saturated carboxylic acid,
   (3) olefinically unsaturated carboxylic acid ester polymers containing polymerized, olefinically unsaturated monomers containing polymerized olefinically unsaturated carboxylic acid ester monomers, (4) polymers of olefinically unsaturated monomers containing alkenyl ether monomer units,
(5) polymers of vinylidene chloride or vinyl chloride with or without other polymerized, olefinically unsaturated monomers, and
(6) combinations thereof.

13. The composition defined in claim 2 wherein said paint composition or paint precursor composition comprises a latex of a polymer and said sol or gel composition comprises an organic solvent and has a pH less than about 4.0.

14. The composition defined in claim 13 wherein said polymer results from emulsion polymerization and comprises about 40 to about 70 weight percent of said latex.

15. The composition defined in claim 3 wherein said sol or gel composition comprises a nonaqueous solvent and a stabilizer.

16. The composition defined in claim 13 wherein said salt comprises at least one aluminum-containing salt.

17. The composition defined in claim 3 wherein said polymer in step (a) results from emulsion polymerization and is contained in said latex in a concentration from about 40 to about 70 weight percent.

18. The composition defined in claim 6 wherein said polymer in step (2) results from emulsion polymerization and is contained in said latex in a concentration from about 40 to about 70 weight percent.

19. The composition defined in claim 7 wherein said polymer results from emulsion polymerization and is contained in said latex in a concentration from about 40 to about 70 weight percent.

20. The composition defined in claim 3 wherein said salt comprises at least one aluminum-containing salt.

21. The composition defined in claim 5 wherein said salt comprises at least one aluminum-containing salt.

22. The composition defined in claim 4 wherein said salt comprises at least one aluminum-containing salt.

23. The composition defined in claim 2 having essentially no discoloration after one week when applied and dried on said wood-containing substrate and subjected to 4 hour intervals of light and moist darkness in a QUV Weatherometer.

24. The composition defined in claim 5 having essentially no discoloration after one week when applied and dried on said wood-containing substrate and subjected to 4 hour intervals of light and moist darkness in a QUV Weatherometer.

25. The surface coating defined in claim 1 wherein the concentration of said salt in said coating composition is about 0.02 to about 1 weight percent.

26. The surface coating defined in claim 2 wherein the concentration of said salt in said coating composition is about 0.02 to about 1 weight percent.

27. The surface coating defined in claim 3 wherein the concentration of said salt in said coating composition is about 0.02 to about 1 weight percent.

28. The surface coating defined in claim 4 wherein the concentration of said salt in said coating composition is about 0.02 to about 1 weight percent.

29. The surface coating defined in claim 5 wherein the concentration of said salt in said coating composition is about 0.02 to about 1 weight percent.

30. The surface coating defined in claim 6 wherein the concentration of said salt in said coating composition is about 0.02 to about 1 weight percent.

31. The surface coating defined in claim 7 wherein the concentration of said salt in said coating composition is about 0.02 to about 1 weight percent.

32. The composition defined in claim 1 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

33. The composition defined in claim 2 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

34. The composition defined in claim 3 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

35. The composition defined in claim 4 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

36. The composition defined in claim 5 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

37. The composition defined in claim 6 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

38. The composition defined in claim 7 wherein said salt is selected from the group consisting of the acetates, citrates, nitrates and halides of ammonium, silver, aluminum, bismuth, boron, calcium, cadmium, cerium, cobalt, chromium, cesium, copper, dyprosium, europiu, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, thorium, yttrium, bismuth, gallium, neodymium, rubidium, zinc and terbium, tetraethylammonium bromide, ferric citrate, sodium vanadate, nickel silylmolybdate, cobalt silylmolybdate, nickel phosphomolybdate, titanium ethoxide, ammonium molybdate, ammonium molybdocobaltate, sodium molybdate, titanium ethylhexoxide, barium carbonate, neodymium nitrate, lanthanum oxide, erbium nitrate, aluminum isopropoxide, and tetrapropylammonium bromide.

39. The composition defined in claim 4 having essentially no discoloration after one week when applied and dried on said wood-containing substrate and subjected to 4 hour intervals of light and moist darkness in a QUV Weatherometer.

40. The composition defined in claim 6 having essentially no discoloration after one week when applied and dried on said wood-containing substrate and subjected to 4 hour intervals of light and moist darkness in a QUV Weatherometer.

41. The composition defined in claim 7 having essentially no discoloration after one week when applied and dried on said wood-containing substrate and subjected to 4 hour intervals of light and moist darkness in a QUV Weatherometer.

* * * * *

UNITED STATES PATENT AND TRADEMARK OFFICE
CERTIFICATE OF CORRECTION

PATENT NO. : 5,162,413

DATED : November 10, 1992

INVENTOR(S) : Charles L. Kissel

It is certified that error appears in the above-identified patent and that said Letters Patent is hereby corrected as shown below:

Claim 16, column 15, line 18, replace "13" with -- 15 --.

Claim 38, column 18, line 8, replace "europiu" with -- europium --.

Signed and Sealed this

Twelfth Day of October, 1993

Attest:

BRUCE LEHMAN

Attesting Officer

Commissioner of Patents and Trademarks